Aug. 8, 1967    S. B. F. CARLSTEDT    3,335,347
REVERSIBLE SINGLE PHASE ASYNCHRONOUS MOTORS
Filed Feb. 23, 1965
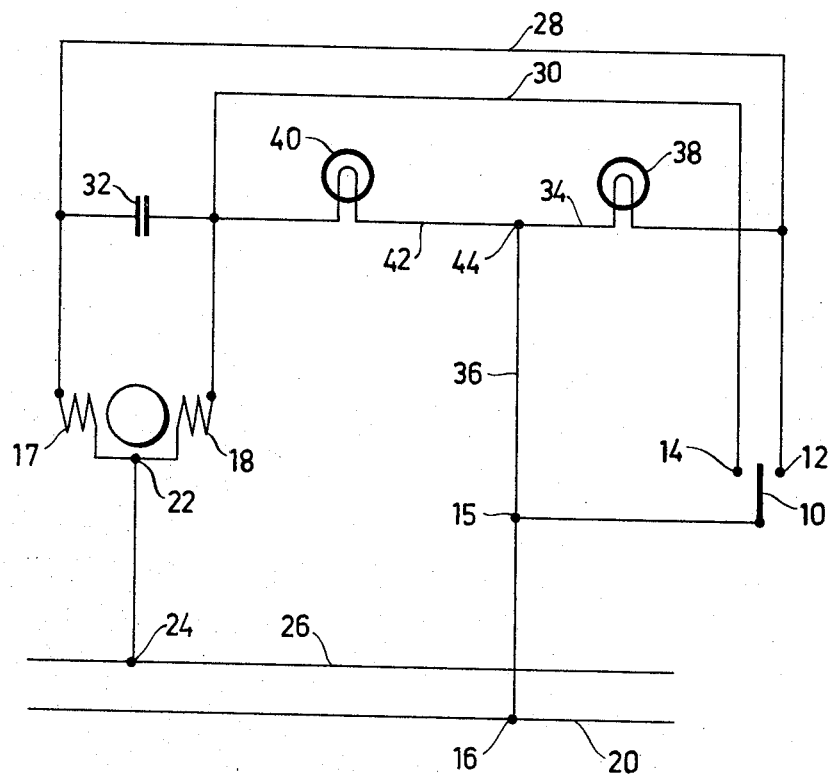
INVENTOR
Sven Börje Fredrik Carlstedt
BY   Greer Maréchal Jr.
ATTORNEY

United States Patent Office 3,335,347
Patented Aug. 8, 1967

3,335,347
REVERSIBLE SINGLE PHASE ASYNCHRONOUS MOTORS
Sven Borje Fredrik Carlstedt, 29 Skepparegatan, Stockholm O, Sweden
Filed Feb. 23, 1965, Ser. No. 434,310
2 Claims. (Cl. 318—207)

This invention relates to reversible single phase asynchronous motors having a shunt wound rotor and two stator windings, said windings having their one end connected to one current supply line and adapted by phase displacement to serve alternately either as a primary winding or as an auxiliary winding for changing the rotatory direction of the rotor controlled by a single pole contact system.

One main object of the invention is to provide a simple connecting system while slowing down the kinetic energy of the rotor by alternating its direction of rotation. This change of its motion is simultaneously noted by a signal marking the current supply to the motor.

According to one main feature of the invention two current circuits are arranged between the ends of the two stator windings not connected directly to a first supply line, and the second supply line, one of the circuits containing two resistive resistors and the other one extending over the switch contact of the contact system, so that with the contact arm in its neutral position, the two resisors are conductive, while the resistor belonging to its respective circuit is shunted when closing its respective contact of the contact system, and vice versa.

Further objects and advantages of the invention will become apparent from the following description, considered in connection with the accompanying drawing which forms part of this specification and which illustrates a circuit diagram.

In the drawing:
The figure is a diagrammatic or schematic indication of the electrical circuits and mechanical aspects of apparatus embodying and for practising this invention.

Referring to the drawing, a contact arm 10 is shown in its neutral position between two contacts 12 and 14. The arm 10 is through connections 15, 16 connected to a supply line 20. Two stator windings 17 and 18 are interconnected at point 22 of the motor, which is connected with the second supply line 26 by a terminal 24. Between the free end of the stator winding 17 and the contact 12 of the contact system extends a circuit 28 and a circuit 30 extends between the free end of the stator winding 18 and the other contact 14. Between the free ends of the stator windings a condenser 32 is interconnected in conventional manner. From the circuit 28 extends a circuit 34, 36 to the terminal 15, and in this circuit 34 a resistor as well as a signal lamp 38, preferably having green light, are connected. The signal lamp 38 is also contained in a circuit connected in parallel with the circuit 28 containing the contact 12 of the contact system. In the same way another resistor 40 as well as a signal lamp, for instance having red light, are arranged in a circuit 42, 36 connected in parallel with the circuit 30.

When the contact arm 10 is in the neutral position between contacts 12 and 14 as shown in the drawing, current will be supplied from the supply line 26 to point 22 of the motor and will there be branched into two branches. One branch passes through the stator line 17 and the signal lamp 38 and the other branch through the stator winding 18 and the signal lamp 40. The branches are then joined in point 44, which is connected to the supply line 20. In this way an equilibrium is achieved, which prevents the rotor from rotating and the two lamps are lighted simultaneously by an energy caused and limited by the resistance in the stator windings 17 and 18, which energy is, however, sufficient to indicate the supply of current.

Should the arm 10 be connected to contact 12 the current flows in the one branch solely through the stator winding 17 and then to the terminal 16 while shunting the lamp 38. In the other branch the current still flows both through the stator winding 18 and the signal lamp 40. Hence the signal 38 has no voltage flowing through it. The current flow in the winding 17 will thus induce an out-of-phase current through the condenser 32 to the stator winding 18, and the motor will be started in a clockwise direction. The inductance generates a voltage for the lamp 40, so that it will indicate the direction of rotation of the motor with a full glow, in this case red. If on the other hand the arm 10 is connected to contact 14 the current flow will be reversed. The stator winding 18 becomes the main winding, the signal lamp 40 will have no voltage flowing through it and the rotor rotates counterclockwise. Signal lamp 38 shows full light and indicates the direction of rotation by its green light.

By means of the circuit system described the stator windings 17 and 18 will by alternately being cut off with a small charge caused by generator action slow down the kinetic energy of the rotor and prevent over-running in one direction or the other. The lamps 38 and 40 indicate the direction of rotation of the motor and whether current is supplied thereto or not.

The circuit system may be contained in an impulse arrangement actuated, for example, by the temperature or pressure of medium. The motor further, may be connected in such a manner that, in response to the arriving impulse it can start a device such as a valve, a pump or the like in order to carry out a control in a predetermined direction.

While one more or less specific embodiment of the invention has been shown and described it is to be understood that this is for purpose of illustration only, and that the invention is not to be limited thereby but its scope is to be determined by the appended claims.

What I claim is:
1. In a reversible single phase asynchronous motor apparatus of the character described having a shunt wound rotor, a single pole contact switch and two stator windings with the first end of each stator winding connected to a single pole contact with one of the supply lines for said apparatus and with the second ends of said stator windings separately connected to the second supply line through said single pole contact switch for selectively connecting one of said stator windings to the said second supply line, the combination which comprises a second parallel circuit between each of the second ends of said stator windings and the said second supply line and bypassing said contact switch, with each of said second parallel circuits having a resistor disposed therein, and a condenser connected in parallel with said single pole contact switch to the said second ends of said stator windings whereby movement of said contact switch selectively connects one of said stator windings directly to said second supply line and shunts the resistor in the said parallel circuit connected thereto thereby causing the current therein to induce an out-of-phase current through said condenser to the other of said stator windings causing the said rotor to rotate in one direction while the generat- ing action therein induces a small charge in the other of said stator windings for producing a dynamic breaking action on said rotor to prevent the over-running of said rotor in one direction or the other, and said contact switch when moved to a neutral position between the contacts with said stator windings connects both said parallel circuits with said resistors disposed therein for dynamically preventing rotation of said rotor.

2. Apparatus as described in claim 1 in which each of said resistors has a different colored lamp connected thereto for indicating the direction of rotation of said rotor.

References Cited

UNITED STATES PATENTS

| 1,114,517 | 10/1914 | Purvis | 340—271 |
| 2,406,193 | 8/1946 | Carson | 318—206 X |

FOREIGN PATENTS

| 319,684 | 5/1930 | Great Britain. |

ORIS L. RADER, *Primary Examiner.*

G. Z. RUBINSON, *Assistant Examiner.*